United States Patent
Takada et al.

(10) Patent No.: US 10,742,147 B2
(45) Date of Patent: Aug. 11, 2020

(54) MOTOR CONTROL CIRCUIT, MOTOR CONTROL DEVICE, ACTUATOR AND CONTROL METHOD FOR STEPPING MOTOR

(71) Applicant: MINEBEA MITSUMI Inc., Nagano (JP)

(72) Inventors: Kazuo Takada, Kosai (JP); Takayuki Matsui, Toyohashi (JP)

(73) Assignee: MINEBEA MITSUMI INC., Nagano (JP)

(*) Notice: Subject to any disclaimer, the term of this patent is extended or adjusted under 35 U.S.C. 154(b) by 0 days.

(21) Appl. No.: 16/261,719

(22) Filed: Jan. 30, 2019

(65) Prior Publication Data
US 2019/0157999 A1    May 23, 2019

Related U.S. Application Data

(63) Continuation of application No. PCT/JP2017/026467, filed on Jul. 21, 2017.

(30) Foreign Application Priority Data

Aug. 3, 2016 (JP) .................................. 2016-153172

(51) Int. Cl.
*H02P 8/14* (2006.01)
*H02P 29/60* (2016.01)
(Continued)

(52) U.S. Cl.
CPC .............. *H02P 8/14* (2013.01); *H02K 37/12* (2013.01); *H02K 37/24* (2013.01); *H02P 8/34* (2013.01); *H02P 29/60* (2016.02)

(58) Field of Classification Search
CPC ...... H02P 8/12; H02P 8/34; H02P 8/14; H02P 29/60; H02P 6/085; H02P 29/032;
(Continued)

(56) References Cited

U.S. PATENT DOCUMENTS 5,264,770 A * 11/1993 Coutu .................. H02P 8/34
                                                    318/685
6,073,689 A *  6/2000 Mizuno ............... G05G 21/00
                                                    165/201
(Continued)

FOREIGN PATENT DOCUMENTS

EP    0 887 534 A    12/1998
JP    07-170790 A     7/1995
(Continued)

OTHER PUBLICATIONS

English translation of the Written Opinion for corresponding International Application No. PCT/JP2017/026467 dated Aug. 29, 2017.
(Continued)

*Primary Examiner* — Thai T Dinh
(74) *Attorney, Agent, or Firm* — Pearne & Gordon LLP

(57) ABSTRACT

A motor control circuit includes an input voltage measuring unit, a temperature measuring unit, a speed setting unit, and a speed control unit. The input voltage measuring unit measures an input voltage input to a motor control device. The temperature measuring unit measures the temperature. The speed setting unit sets a target value of driving speed of a stepping motor based on a measurement result of the input voltage measuring unit, a measurement result of the temperature measuring unit and based on a set value of driving speed preset for each of the plural partial areas which are sectioned in a matrix form with a threshold value related to the input voltage and a threshold value related to the temperature. The speed control unit controls the driving speed according to the target value of the driving speed set in the speed setting unit.

6 Claims, 5 Drawing Sheets

(51) Int. Cl.
*H02K 37/12* (2006.01)
*H02K 37/24* (2006.01)
*H02P 8/34* (2006.01)

(58) Field of Classification Search
CPC ........ H02K 37/12; H02K 37/24; H02K 11/20; H02K 11/33
See application file for complete search history.

(56) References Cited

U.S. PATENT DOCUMENTS

| | | | |
|---|---|---|---|
| 7,338,260 B2* | 3/2008 | Brundle | A61M 5/142 417/12 |
| 8,659,259 B2* | 2/2014 | Suda | H02P 8/12 318/696 |
| 9,030,143 B2* | 5/2015 | Guzelgunler | H02P 29/02 318/461 |
| 9,647,588 B2* | 5/2017 | Nagaraj | H02P 29/032 |
| 2008/0024940 A1* | 1/2008 | Plunkett | H02H 7/093 361/25 |
| 2008/0084173 A1* | 4/2008 | Grabinger | G05B 19/19 318/432 |
| 2009/0206788 A1* | 8/2009 | Ando | H02P 8/32 318/696 |
| 2012/0001579 A1* | 1/2012 | Mori | G03G 15/5004 318/473 |
| 2015/0042258 A1* | 2/2015 | Takada | H02P 8/10 318/696 |

FOREIGN PATENT DOCUMENTS

| | | |
|---|---|---|
| JP | 11-018491 A | 1/1999 |
| JP | 11-294196 A | 10/1999 |

OTHER PUBLICATIONS

International Preliminary Report on Patentability for corresponding International Application No. PCT/JP2017/026467 dated Feb. 5, 2019.
International Search Report for corresponding International Application No. PCT/JP2017/026467 dated Aug. 29, 2017.
Written Opinion for corresponding International Application No. PCT/JP2017/026467 dated Aug. 29, 2017.
Notification of Reasons for Refusal dated Apr. 16, 2019 in corresponding Japanese Application No. 2016-153172 and English translation.

* cited by examiner

MOTOR CONTROL CIRCUIT, MOTOR CONTROL DEVICE, ACTUATOR AND CONTROL METHOD FOR STEPPING MOTOR

CROSS REFERENCE TO RELATED APPLICATIONS

The present application is a continuation application of International Patent Application No. PCT/JP2017/026467 filed on Jul. 21, 2017, which claims the benefit of Japanese Patent Application No. 2016-153172, filed on Aug. 3, 2016. The contents of these applications are incorporated herein by reference in their entirety.

BACKGROUND

Technical Field

The present disclosure relates to a motor control circuit, a motor control device, an actuator, and a control method for a stepping motor, and particularly relates to a motor control circuit, a motor control device, an actuator and a control method for a stepping motor, which is used for an actuator utilizing a stepping motor.

Background

Stepping motors have various features such as being easy to control, and are widely used for various actuators and the like (for example, see Japanese Patent Application Laid-Open No. H07-170790).

With respect to an actuator using such a stepping motor, the specification of required torque and driving speed is appropriately set according to the intended use of the actuator and the like. On the other hand, under an environment in which the actuator is used, the temperature and the input voltage input to a motor control device may fluctuate in some cases.

Under a broad use environment in which the condition of the temperature and the input voltage varies as described above, it is difficult to drive the stepping motor so as to satisfy the set specification. Specifically, for example, when the input voltage is relatively low and the temperature is relatively low especially at the time of a cold start, the torque of the actuator is lacking.

The present disclosure is related to providing a motor control circuit, a motor control device, an actuator, and a control method for a stepping motor that are capable of driving a motor while securing driving torque under a wide use environment.

SUMMARY

According to an aspect of the present disclosure, a motor control circuit for use in a motor control device for driving a stepping motor comprises: an input voltage measuring unit for measuring an input voltage input to the motor control device; a temperature measuring unit for measuring temperature; a speed setting unit for setting a target value of a driving speed of the stepping motor based on a measurement result of the input voltage measuring unit and a measurement result of the temperature measuring unit; and a speed control unit for controlling the driving speed according to the target value of the driving speed set by the speed setting unit, wherein the speed setting unit sets the target value based on a set value of the driving speed preset for each of a plurality of partial areas that are sectioned in a matrix form with a threshold value related to the input voltage and a threshold value related to the temperature.

Preferably, the speed setting unit sets the target value based on the set value preset for each of nine partial areas which are sectioned in a matrix form of 3 rows and 3 columns with two threshold values related to the input voltage and two threshold values related to the temperature.

Preferably, with respect to respective ranges of a low voltage range, a middle voltage range and a high voltage range that are sectioned with the two threshold values for the input voltage, the set value is set to be larger in the middle voltage range than that in the low voltage range, and also larger in the high voltage range than that in the middle voltage range, and also with respect to respective ranges of a low temperature range, a middle temperature range and a high temperature range that are sectioned with the two threshold values for the temperature, the set value is set to be larger in the high temperature range than that in the middle temperature range and also larger in the low temperature range than that in the high temperature range.

According to another aspect of the present disclosure, a motor control device comprises: the motor control circuit described above; and a drive circuit for driving the stepping motor, wherein the motor control circuit outputs a control signal for controlling the driving speed from the speed control unit, and the drive circuit makes a drive current flow through a coil of the stepping motor based on the control signal.

According to yet another aspect of the present disclosure, an actuator comprises: a stepping motor for generating driving force; the motor control circuit described above, and a drive circuit for making a drive current flow through a coil of the stepping motor based on a control signal output for controlling the driving speed from the speed control unit.

According to yet another aspect of the present disclosure, a control method for a stepping motor comprises: an input voltage measuring step of measuring an input voltage; a temperature measuring step of measuring temperature; a speed setting step of setting a target value of a driving speed of the stepping motor based on a measurement result of the input voltage measuring step and a measuring result of the temperature measuring step; and a speed control step of controlling the driving speed according to the target value of the driving speed set in the speed setting step, wherein the speed setting step sets the target value based on a set value of the driving speed preset for each of a plurality of partial areas that are sectioned in a matrix form with a threshold value related to the input voltage and a threshold value related to the temperature.

According to these disclosures, it is possible to provide a motor control circuit, a motor control device, an actuator, and a control method for a stepping motor that are capable of driving a motor while securing driving torque under a wide use environment.

DETAILED DESCRIPTION

A motor control device according to an embodiment of the present disclosure will be described hereinafter.

The motor control device is, for example, a device for driving a stepping motor having coils of plural phases. The motor control device controls the energization state of the coil of each phase so as to drive the stepping motor. In the present embodiment, the motor control device includes a drive circuit for energizing the coils of the stepping motor, and a motor control circuit for controlling the drive circuit.

An actuator is constituted by a motor control device, a stepping motor driven by the motor control device, and other mechanical parts. In the actuator, the stepping motor is supplied with drive power from the drive circuit to be driven. In the actuator, the drive circuit is controlled by the motor control circuit, whereby the driving of the stepping motor is controlled.

Embodiment

Figure 1:
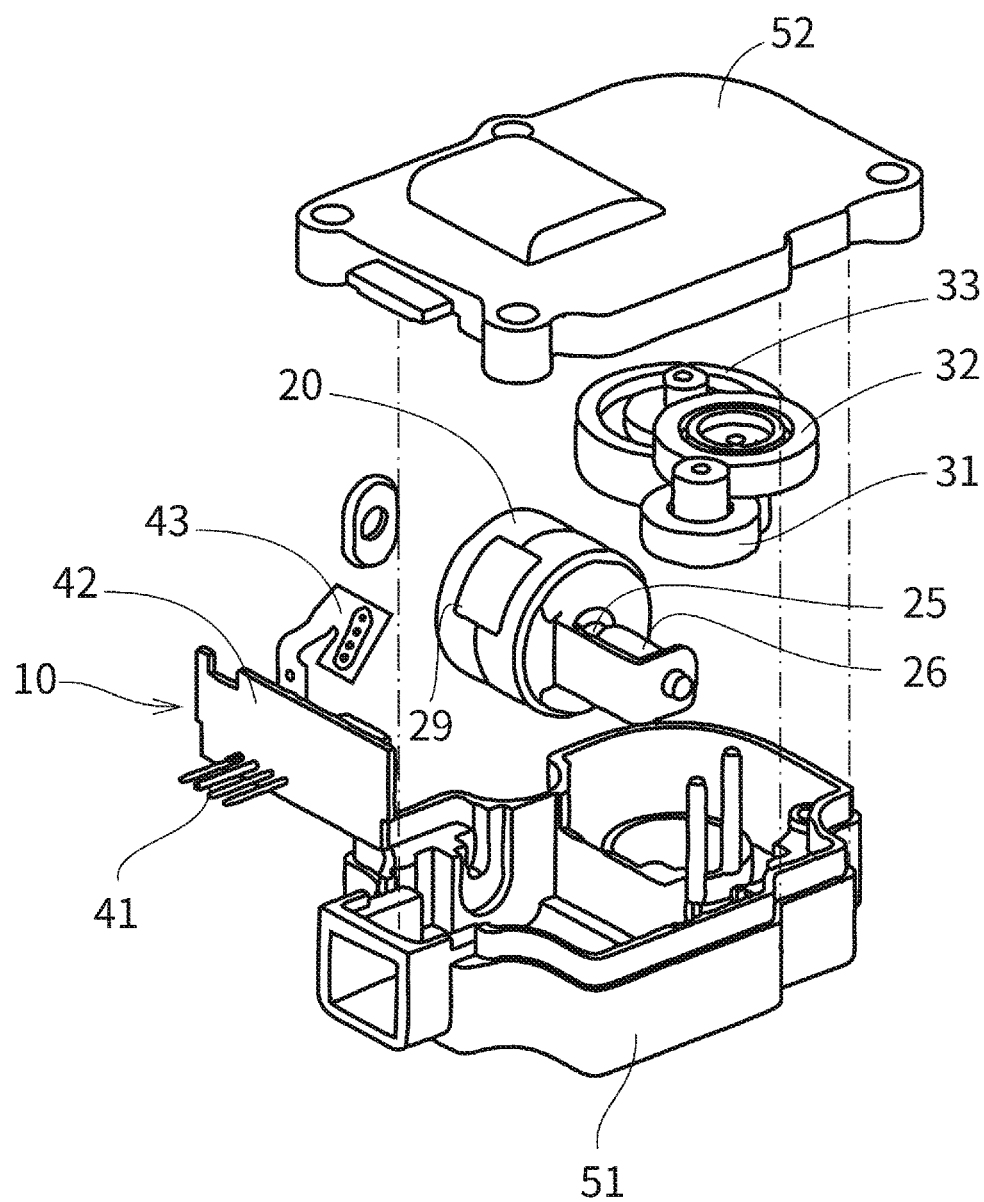
FIG. 1 is an exploded perspective view showing an example of an actuator used for a motor control device of an embodiment of the present disclosure.

FIG. 1 is an exploded perspective view showing an example of an actuator used for the control device of an embodiment of the present disclosure.

As shown in FIG. 1, the actuator 1 is covered by a case 51 and a cover 52. A motor control device 10, a stepping motor 20, a secondary gear 31, a tertiary gear 32, an output gear 33, and the like are accommodated in the actuator 1. An external output gear provided to the output gear 33 is exposed on the bottom surface of the case 51, and the driving force of the actuator 1 is transmitted to the outside by the external output gear.

The stepping motor 20 generates the driving force of the actuator 1. A primary gear 26 is attached to an output shaft 25 of the stepping motor 20. The primary gear 26 of the stepping motor 20 meshes with the secondary gear 31. The secondary gear 31 meshes with the tertiary gear 32. The tertiary gear 32 meshes with the output gear 33.

The motor control device 10 has a printed circuit board 42, a flexible printed circuit board 43 for connecting the printed circuit board 42 and a motor terminal 29 of the stepping motor 20, and the like. The printed circuit board 42 is provided with a drive circuit 14 (shown in FIG. 2) for driving the stepping motor 20, a motor control circuit 12 (shown in FIG. 2) for controlling the drive circuit 14, and the like. External connection terminals 41 exposed to the outside of the case 51 and the cover 52 are provided to the printed circuit board 42. A voltage is input from the outside to the motor control device 10 via the external connection terminals 41 or an instruction signal from external equipment is received, whereby the motor control device 10 operates.

The motor control device 10 supplies drive power to the stepping motor 20 based on an input voltage to drive the stepping motor 20. When the stepping motor 20 is driven, the primary gear 26 rotates together with the output shaft 25. The driving force of this rotation is sequentially transmitted to the secondary gear 31, the tertiary gear 32, the output gear 33, and the external output gear, and is output to the outside by the external output gear.

It is to be noted that the circuits accommodated inside the case 51 and the cover 52 may be, for example, only the drive circuit 14. In this case, the motor control device 10 may be constituted by the drive circuit 14 inside the case 51 and the cover 52, and the external motor control circuit 12 connected to the drive circuit 14.

Figure 2:
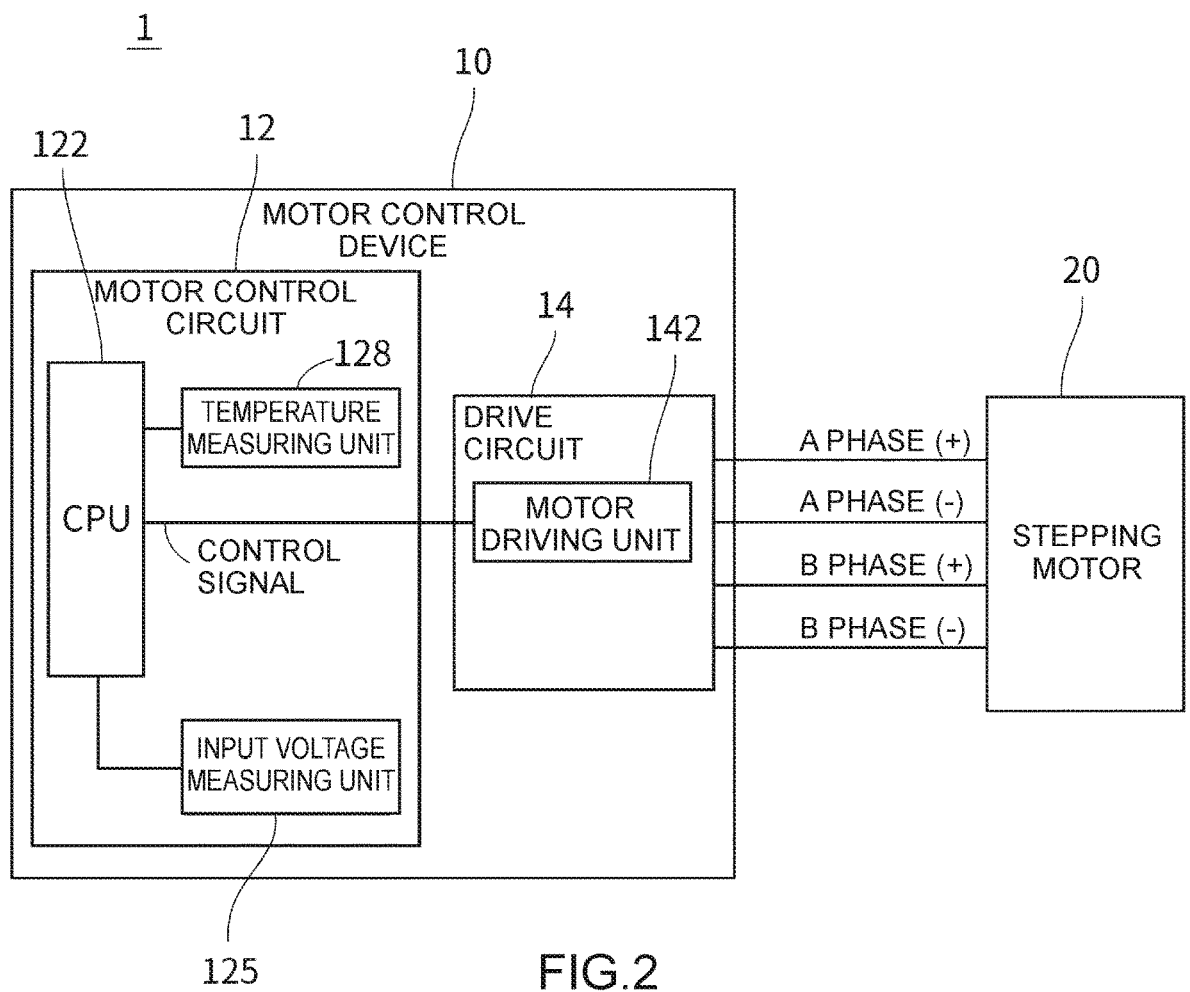
FIG. 2 is a block diagram of a motor and a motor control device constituting an actuator of an embodiment of the present disclosure.

FIG. 2 is a block diagram of the motor and the motor control device constituting the actuator of an embodiment of the present disclosure.

As shown in FIG. 2, the actuator 1 has the motor control device 10 and the stepping motor 20. The stepping motor 20 is driven by 2-phase excitation of A phase and B phase, for example. The stepping motor 20 has an A-phase coil and a B-phase coil (shown in FIG. 3). The stepping motor 20 is driven by supplying drive power to the coil of each phase from the motor control device 10. The stepping motor 20 is used, for example, as an actuator for an air conditioner installed in a vehicle. The intended use of the stepping motor 20 and the actuator 1 is not limited to this application.

The motor control device 10 has the motor control circuit 12 and the drive circuit 14.

The drive circuit 14 has a motor driving unit 142. The drive circuit 14 supplies drive power to the stepping motor 20 to drive the stepping motor 20.

The motor control circuit 12 has a CPU (central processing unit; an example of a speed setting unit, an example of a speed control unit) 122, an input voltage measuring unit 125, and a temperature measuring unit 128. The motor control circuit 12 controls driving of the stepping motor 20 by controlling the drive circuit 14. In the present embodiment, the motor control circuit 12 is packaged as an IC (integrated circuit).

The motor driving unit 142 applies a voltage to the coil of each phase of the stepping motor 20. A control signal is transmitted from CPU 122 to the motor driving unit 142. The motor driving unit 142 applies the voltage based on the control signal. In the present embodiment, the drive circuit 14 and the stepping motor 20 are connected to each other via four lines of an A-phase positive electrode (+), an A-phase negative electrode (−), a B-phase positive electrode (+) and a B-phase negative electrode. The motor driving unit 142 supplies drive power to the stepping motor 20 via each of these lines in accordance with the control signal. The control signal is a PWM signal, and the drive power varies according to the duty ratio of the PWM signal.

The input voltage measuring unit 125 measures the input voltage to be input to the motor control device 10. The input voltage measuring unit 125 outputs the measurement result of the input voltage to CPU 122.

The temperature measuring unit 128 is, for example, a temperature sensor for measuring the internal temperature of the IC of the motor control circuit 12. The temperature measuring unit 128 outputs temperature information representing the temperature of the motor control circuit 12 to CPU 122.

In the present embodiment, CPU 122 has the functionality of a speed setting unit and a speed control unit. A measurement result of the input voltage output from the input voltage measuring unit 125 and temperature information output from the temperature measuring unit 128 are input to CPU 122 as the speed setting unit. The speed setting unit sets a target value of the driving speed of the stepping motor 20 based on the measurement result of the input voltage measuring unit 125 and the measurement result of the temperature measuring unit 128. Furthermore, the speed setting unit sets the target value based on a set value of the driving speed for each of the plural partial areas sectioned in a matrix form with a threshold value related to the input voltage and a threshold value related to the temperature. CPU 122 as the speed control unit generates a control signal for controlling the driving speed of the stepping motor 20 according to the target value of the driving speed set by the speed setting unit. CPU 122 outputs the generated control signal to the motor driving unit 142.

Figure 3:
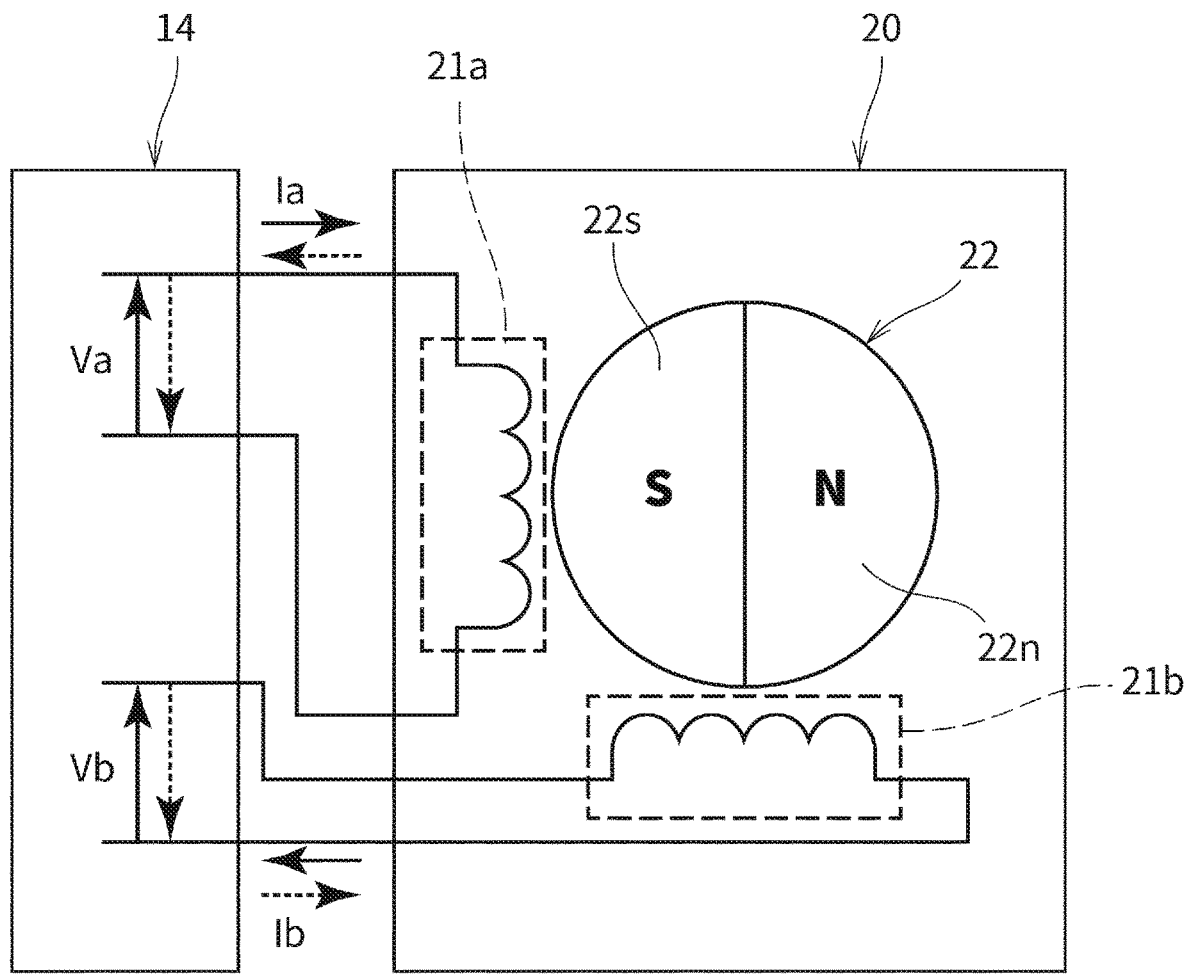
FIG. 3 is a schematic diagram showing a circuit configuration of a stepping motor.

FIG. 3 is a diagram schematically showing a circuit configuration of the stepping motor 20.

As shown in FIG. 3, the stepping motor 20 has two coils 21*a* and 21*b*, a rotor 22, and plural stator yokes (not shown).

Each of the coils 21*a* and 21*b* is a coil for exciting the stator yokes. Each of the coils 21*a* and 21*b* is connected to the drive circuit 14. The coil 21*a* is an A-phase coil. The coil 21*b* is a B-phase coil. Coil currents of different phases are made to flow through the coils 21*a* and 21*b*, respectively.

The rotor 22 includes a permanent magnet which is magnetized in a multipolar style so that the S-poles 22*s* and N-poles 22*n* are alternately reversed along a peripheral direction. In FIG. 3, the rotor 22 is illustrated in such a simplified manner that one S-pole 22*s* and one N-pole 22*n* are provided. The stator yokes are arranged around the rotor 22 to be close to the outer peripheral portion of the rotor 22. The rotor 22 is rotated by periodically switching the phase of the coil current flowing through each of the coils 21*a* and 21*b*.

In the present embodiment, CPU 122 sets the target value of the driving speed of the stepping motor 20 based on the measurement result of the temperature and the measurement result of the input voltage as described below. Then, CPU 122 generates the control signal so that the driving speed becomes equal to the target value, thereby causing the stepping motor 20 to drive at the set speed.

That is, CPU 122 sets a target value of the driving speed as the speed setting unit based on the set value of the driving speed which has been set in advance. The set value is set in advance for each of the plural partial areas that are sectioned in a matrix form with a threshold value related to the input voltage and a threshold value related to the temperature. In the present embodiment, a set value of the driving speed is set in advance for each of nine partial areas which are sectioned in a matrix form of 3 rows and 3 columns (3×3) by two threshold values related to the input voltage and two threshold values related to the temperature.

Figure 4:
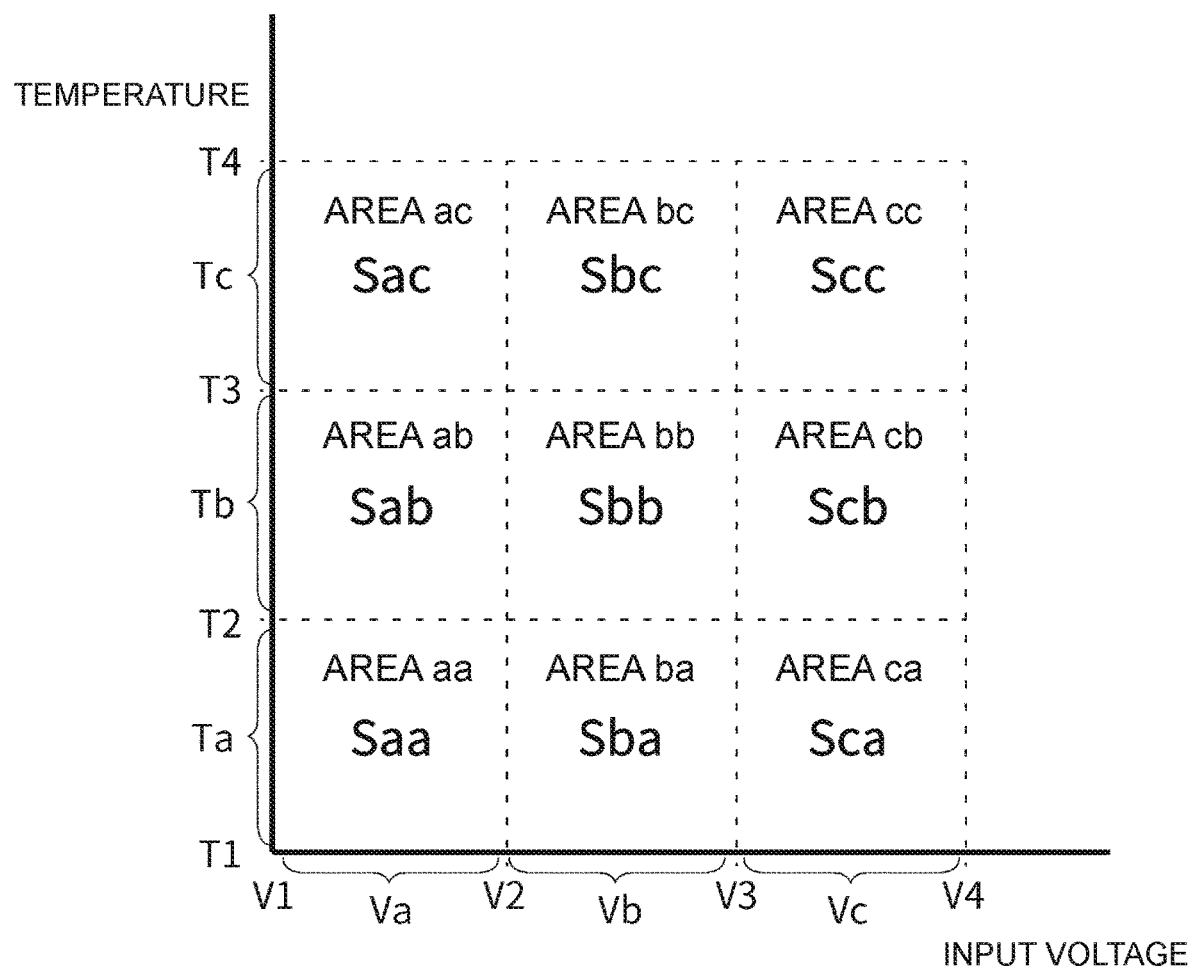
FIG. 4 is a diagram showing a setting example of a set value of a driving speed.

FIG. 4 is a diagram showing a setting example of the set value of the driving speed.

In FIG. 4 is shown an example in which one of set values Saa, Sab, Sac, Sba, Sbb, Sbc, Sca, Scb and Scc is set for each of partial areas aa, ab, ac, ba, bb, bc, ca, cb, and cc of 3 rows and 3 columns as described above. That is, one of a total of nine set values Saa to Sac is set for each of the nine partial areas aa to cc.

The respective partial areas aa to cc are sectioned in a matrix form with threshold values V2 and V3 related to the input voltage and threshold values T2 and T3 related to the temperature. That is, the range of input voltages from V1 to V4 is divided into three voltage ranges (sectioned areas) Va, Vb, and Vc by the threshold values V2 and V3. The low voltage range Va is a range from not less than V1 to less than V2. The middle voltage range Vb is a range from not less than V2 to less than V3. The high voltage range Vc is a range from not less than V3 to less than V4. Furthermore, the range of input temperatures from T1 to T4 is divided into three temperature ranges (sectioned areas) Ta, Tb, and Tc by the threshold values T2 and T3. The low temperature range Ta is a range from not less than T1 to less than T2. The middle temperature range Tb is a range from not less than T2 to less than T3. The high temperature range Tc is a range from not less than T3 to less than T4. By combining the three voltage ranges Va, Vb, and Vc and the three temperature ranges Ta, Tb, and Tc, the nine partial areas from aa to cc form a matrix.

CPU 122 specifies a partial area corresponding to a current state as a control area among nine partial areas from aa to cc based on the measurement result of the temperature and the measurement result of the input voltage which have been input to CPU 122. Then, CPU 122 reads out the set value corresponding to the specified control area, and sets the set value as the target value of the driving speed. As a result, CPU 122 outputs a control signal to the drive circuit 14 and controls the stepping motor 20 so that the driving speed of the stepping motor 20 becomes equal to a driving speed having the same magnitude as the set value of the driving speed corresponding to the temperature and the input voltage.

With respect to respective ranges of a low voltage range, a middle voltage range and a high voltage range that are sectioned with the two threshold values for the input voltage, the set value of the driving speed is set to be larger in the middle voltage range than that in the low voltage range, and also larger in the high voltage range than that in the middle voltage range, and also with respect to respective ranges of a low temperature range, a middle temperature range and a high temperature range that are sectioned with the two threshold values for the temperature, the set value is set to be larger in the high temperature range than that in the low temperature range and also larger in the middle temperature range than that in the high temperature range.

More specifically, the set values from Saa to Scc are set for the input voltage so that the set value in the middle voltage range Vb is larger than that in the low voltage range Va while the set value in the high voltage range Vc is larger than that in the middle voltage range Vb for the input voltage, and also set for the temperature so that the set value in the high temperature range Tc is larger than that in the low temperature range Ta while the set value in the middle temperature range Tb is larger than that in the high temperature range Tc for the temperature.

That is, the magnitude of the driving speed, that is, the magnitudes of the set values from Saa to Sac has the following relationship.

For the input voltage, (in the case of the voltage range Va)≤(in the case of Vb)≤(in the case of Vc).

For the temperature, (in the case of the temperature range Ta)≤(in the case of Tc)≤(in the case of Tb).

For example, upon comparison under the condition of the low temperature range T1, the following relationship is established.

(The set value Saa in the low voltage and low temperature area aa)≤(the set value Sba in the middle voltage and low temperature area Iba)≤(the set value Sca in the high voltage and low temperature area ca).

Furthermore, for example, upon comparison under the condition of the low voltage range V1, the following relationship is established.

(The set value Saa in the low voltage and low temperature area aa)≤(the set value Sac in the low voltage and high temperature area ac)≤(the set value Sab in the low voltage and middle temperature area ab).

In the present embodiment, each set value is set so that the relationship between the input voltage and the set value of the driving speed becomes as follows.

That is, in the low voltage range Va, the set value is set to be relatively small. As a result, even when the input voltage is low, the torque of the stepping motor 20 can be secured by reducing the driving speed.

On the other hand, in the high voltage range Vc, the set value is set to be relatively large. As a result, the stepping motor 20 can be rotated quickly by increasing the driving speed.

Furthermore, each set value is set so that the relationship between the temperature and the set value of the driving speed becomes as follows.

That is, in the low temperature range Ta, the set value is set to a relatively small value. Under a low temperature environment, grease coated on the movable parts such as the gears 26, 31, 32, and 33, etc. hardens in the actuator 1, and a load on the stepping motor 20 increases. The set value is set to a small value so that sufficient torque can be obtained even under an environment in which the load increases as described. Thus, the stepping motor 20 can be driven with a large torque by reducing the driving speed.

Furthermore, the set value is also set to a relatively small value even in the high temperature range Tc. Under a high temperature environment, resin of the gears 26, 31, 32, 33, etc. expands, and clogs the gears so that the load on the stepping motor 20 increases. Therefore, as in the case of the low temperature environment, the set value is set to be small. Incidentally, the extent to which the load of the stepping motor 20 increases is higher in a case where the viscosity of the grease increases due to a decrease in the temperature than that in a case where raw materials expand due to increase in temperature. Therefore, it is desirable to make the set value smaller in the lower temperature range Ta than that in the high temperature range Tc.

In the present embodiment, the input voltage, the temperature, and the set value of the driving speed are set to, for example, the following values. In this case, the input voltage as a reference is substantially equal to 12V, and an actuator 1 used under a room temperature environment is assumed.

With respect to the threshold values, the lower limit value V1 and the upper limit value V4 of the input voltage, the lower limit value T1 and the upper limit value T4 of the temperature may be appropriately set. These lower limit values V1, T1 and upper limit values V4, T4 may not be set, and in this case, the low voltage range Va is a range of all voltages which are not more than the threshold V2, and the high voltage range Vc is a range of all voltages which are not less than the threshold value V3. Furthermore, the low temperature range Ta is a range of all temperatures which are not more than the threshold value T2, and the high temperature range Tc is a range of all temperatures which are not less than the threshold value T3.

The specific values of the set values and the threshold values can be appropriately set depending on the application or specification of the actuator 1 and the stepping motor 20, the magnitude of the input voltage, the variation amount of the input voltage, the assumed temperature, etc. by using an experimental result, a simulation result, or the like.

Figure 5:
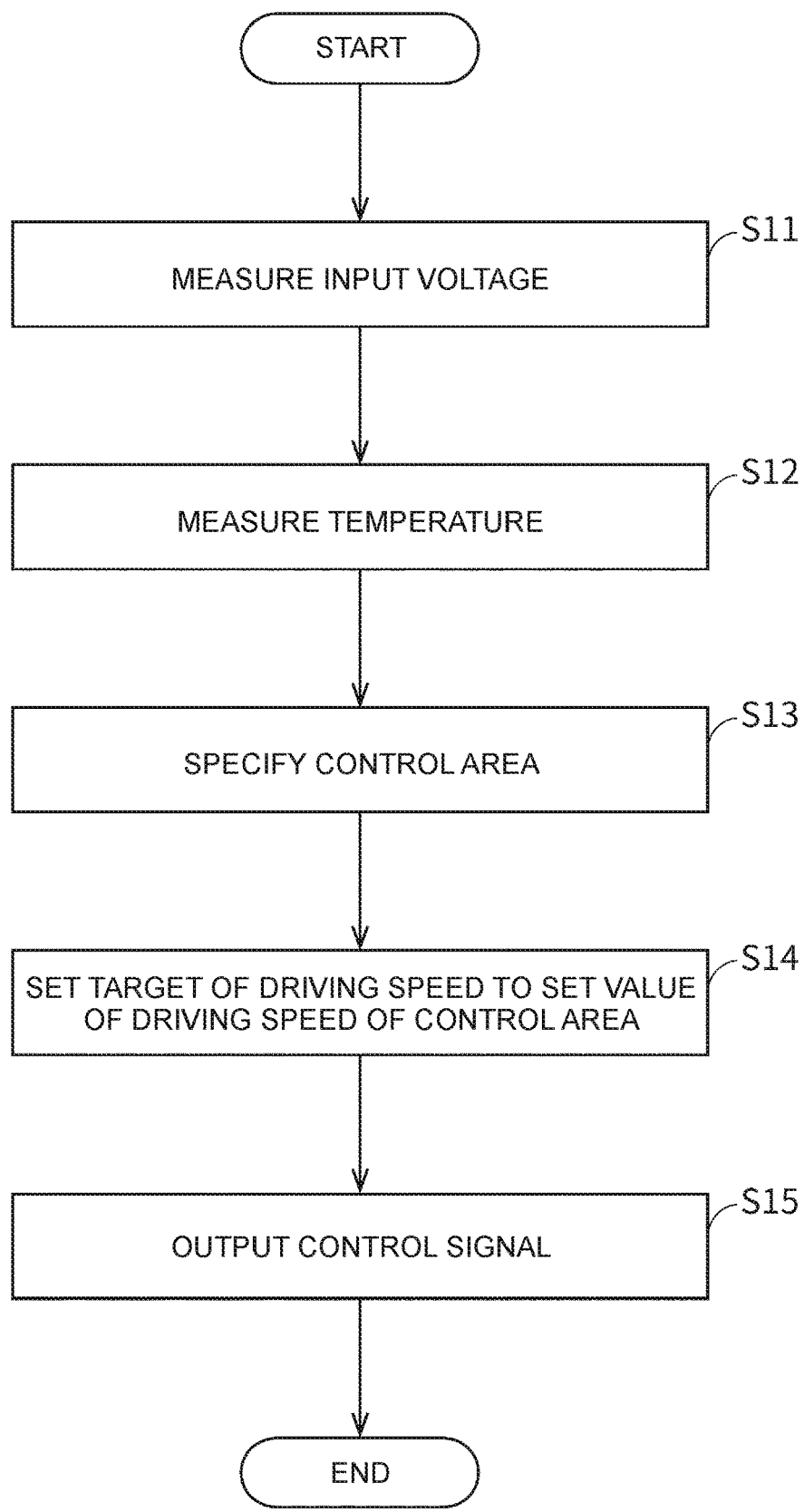
FIG. 5 is a flowchart which roughly shows target value setting processing of the driving speed of the stepping motor which is performed by the motor control device.

FIG. 5 is a flowchart to roughly describe target value setting processing of the driving speed of the stepping motor 20, which is performed by the motor control device 10.

As shown in FIG. 5, the input voltage is measured by the input voltage measuring unit 125 (input voltage measuring step) in step S11, In step S12, the temperature is measured by the temperature measuring unit 128 (temperature measuring step). It is to be noted that steps S11 and S12 may be performed simultaneously or with the order of the steps being reversed.

In step S13, CPU 122 specifies a partial area containing a current state as a control area among the nine partial areas from aa to cc based on the measurement result of the temperature and the measurement result of the input voltage.

In step S14, CPU 122 reads out the set value of the driving speed corresponding to the specified control region, and sets the set value as the target value of the driving speed as a speed setting unit (speed setting step).

In step S15, CPU 122 outputs a control signal according to the set target value of the driving speed as a speed control unit (speed control step).

For example, the processing shown in FIG. 5 is performed after CPU 122 receives a command for driving the stepping motor 20. When the processing shown in FIG. 5 is finished and the target value of the driving speed is set, the driving speed is adjusted until the stepping motor 20 reaches a target point.

Effect in Embodiment

In the actuator 1 using the motor control device 10 configured as described above, since the target value of the driving speed can be set based on the set value of the driving speed preset for each partial area which is determined by the relationship between the input voltage and the temperature, the stepping motor 20 can be controlled so that appropriate driving torque can be stably obtained under various environments.

That is, the set value of the driving speed is set according to the range of the input voltage. Therefore, when a sufficient input voltage is obtained, the stepping motor 20 can be driven at a relatively high speed, and even under a relatively low-voltage situation, shortage of torque can be improved. Furthermore, the threshold value for sectioning the range of the input voltage can be arbitrarily set, and the driving speed can be finely adjusted in accordance with each voltage range.

Furthermore, the set value of the driving speed is set according to the temperature range. Therefore, particularly when the temperature is high or low, shortage of torque caused by the influence of temperature can be improved.

Particularly, in the present embodiment, in a situation where the voltage is low and the temperature is low, for example, at the time of a cold start or where the shortage of torque is likely to occur, it is possible to drive the stepping motor 20 while the torque is secured by reducing the driving speed.

Particularly, in the present embodiment, the internal temperature of IC is measured, and used for determining the target value of the driving speed. It is possible to measure a temperature close to the temperature of a site which is slightly away from the stepping motor 20 whose temperature may vary due to the operation of the stepping motor 20, the site causing increase of a load due to the influence of the temperature, and determine the target value of the driving speed by using a measurement result of the temperature. Therefore, it is possible to drive the stepping motor 20 at an appropriate driving speed while securing the torque according to the situation. It is to be noted that the temperature of another site may be measured regardless of the internal temperature of the IC.

[Others]

For example, in such a situation that the temperature is low and the voltage is low as described above, when the stepping motor 20 is driven at a lower driving speed than that in the other cases, the stepping motor 20 may be controlled to be driven at a predetermined higher driving speed after lapse of a predetermined time from the start of the driving of the stepping motor 20.

In the above case, it is possible to normally set, as the predetermined time, a time which is taken from the start of the driving of the stepping motor 20 until the driving is stabilized. As a result, at the time of the cold start or the like, the stepping motor 20 can be driven with the torque being ensured, and after the stepping motor 20 is stabilized and set to a drivable state, the stepping motor 20 can be driven at a normal driving speed.

The number of divisions of the matrix may be equal to 2 rows by 2 columns (2×2) or more, and the number of threshold values for the input voltage and the number of threshold values for temperature may be different from each other. The number of divisions of the matrix may be appropriately set, for example, like 2×3, 2×4, 4×4 or the like.

The configuration of the above-described actuator is merely an example, and it may be a configuration different from the above-described configuration.

Only a part of the control circuit may be configured as an integrated circuit. Furthermore, a part of a portion of the motor control device which is different from the control circuit may be configured as an integrated circuit. The whole of the motor control device may be configured as an integrated circuit.

The hardware configurations of the actuator such as the stepping motor and the motor control device are not limited to the foregoing configurations.

The processing in the above-described embodiment may be performed by software or may be performed by using a hardware circuit.

A program for executing the processing in the above-described embodiment may be provided, and the program may be recorded in a storage medium such as CD-ROM, a flexible disk, a hard disk, ROM, RAM, or a memory card to be provided to a user. The program may be downloaded to a device via a communication line such as over the Internet. The processing described in the flowcharts and the text is executed by the CPU or the like in accordance with the program.

It is to be understood that the above-described embodiment is illustrative in all respects and not restrictive. The scope of the present disclosure is defined not by the foregoing description, but by the claims, and it is intended to include meanings equivalent to the claims and all variants within the claims.

What is claimed is:

1. A motor control circuit for use in a motor control device for driving a stepping motor, the motor control circuit comprising:
    an input voltage measuring unit for measuring an input voltage input to the motor control device;
    a temperature measuring unit for measuring temperature;
    a speed setting unit for setting a target value of a driving speed of the stepping motor based on a measurement result of the input voltage measuring unit, a measurement result of the temperature measuring unit, and based on a set value of the driving speed preset for each of a plurality of partial areas that are sectioned in a matrix form with a threshold value related to the input voltage and a threshold value related to the temperature; and
    a speed control unit for controlling the driving speed according to the target value of the driving speed set by the speed setting unit and stabilizing a drive torque of the stepping motor.

2. The motor control circuit according to claim 1, wherein the speed setting unit sets the target value based on the set value preset for each of nine partial areas which are sectioned in the matrix form of 3 rows and 3 columns with two threshold values related to the input voltage and two threshold values related to the temperature.

3. The motor control circuit according to claim 2, wherein with respect to respective ranges of a low voltage range, a middle voltage range and a high voltage range that are sectioned with the two threshold values for the input voltage, the set value is set to be larger in the middle voltage range than that in the low voltage range, and also larger in the high voltage range than that in the middle voltage range, and also with respect to respective ranges of a low temperature range, a middle temperature range and a high temperature range that are sectioned with the two threshold values for the temperature, the set value is set to be larger in the high temperature range than that in the low temperature range and also larger in the middle temperature range than that in the high temperature range.

4. A motor control device comprising:
    the motor control circuit according to claim 1; and
    a drive circuit for driving the stepping motor, wherein the motor control circuit outputs a control signal for controlling the driving speed from the speed control unit, and the drive circuit makes a drive current flow through a coil of the stepping motor based on the control signal.

5. An actuator comprising:
    a stepping motor for generating driving force;
    the motor control circuit according to claim 1; and
    a drive circuit for making a drive current flow through a coil of the stepping motor based on a control signal output for controlling the driving speed from the speed control unit.

6. A control method for a stepping motor, the control method comprising:
    an input voltage measuring step of measuring an input voltage;
    a temperature measuring step of measuring temperature;
    a speed setting step of setting a target value of a driving speed of the stepping motor based on a measurement result of the input voltage measuring step, a measuring result of the temperature measuring step, and based on a set value of the driving speed preset for each of a plurality of partial areas that are sectioned in a matrix form with a threshold value related to the input voltage and a threshold value related to the temperature; and
    a speed control step of controlling the driving speed according to the target value of the driving speed set in the speed setting step and stabilizing a drive torque of the stepping motor.

* * * * *